United States Patent [19]

Gellert

[11] Patent Number: 4,786,246

[45] Date of Patent: * Nov. 22, 1988

[54] INJECTION MOLDING MULTIPLE NOZZLE VALVE GATING SYSTEM

[76] Inventor: Jobst U. Gellert, 7A Prince St., Georgetown, Ontario, Canada

[*] Notice: The portion of the term of this patent subsequent to Jun. 2, 2004 has been disclaimed.

[21] Appl. No.: 86,641

[22] Filed: Aug. 18, 1987

[30] Foreign Application Priority Data

Jul. 15, 1987 [CA] Canada .................................. 542182

[51] Int. Cl.$^4$ ............................................. B29C 45/22
[52] U.S. Cl. .................................. 425/549; 264/328.8; 425/562; 425/570; 425/573; 425/588
[58] Field of Search ............... 425/542, 547, 549, 552, 425/562, 564, 565, 566, 568, 570, 571, 572, 588, 573; 264/328.8, 328.9, 328.15, 297.2, 328.11

[56] References Cited

U.S. PATENT DOCUMENTS

| | | | |
|---|---|---|---|
| 4,312,630 | 1/1982 | Travaglini | 425/568 |
| 4,557,685 | 12/1985 | Gellert | 425/549 |
| 4,648,546 | 3/1987 | Gellert | 228/161 |
| 4,669,971 | 6/1987 | Gellert | 425/549 |
| 4,682,944 | 7/1987 | Muller | 425/572 |

FOREIGN PATENT DOCUMENTS

1174020 9/1984 Canada .

OTHER PUBLICATIONS

Canadian Patent Application "Coated Injection Molding Nozzle and Method", Filed Jul. 15, 1987.
Canadian Patent Application "Injection Molding Nozzle with Hollow Sealing and Locating Flange and Method", Filed Jul. 15, 1987.
Canadian Patent Application 524,969, "Mechanism for Valve Gated Injection Molding", for Resilient Retaining Ring Filed 12-10-87.

Primary Examiner—Jay H. Woo
Assistant Examiner—Timothy W. Heitbrink
Attorney, Agent, or Firm—Riches, McKenzie & Herbert

[57] ABSTRACT

This invention relates to a multi-cavity injection molding system in which a number of nozzles are fixed to a common manifold, and valve gating is provided by actuating the manifold and the nozzles together. A pair of hydraulically actuated pistons are mounted to drive the manifold and nozzles between a retracted open position and a forward closed position. Each nozzle has a truncated tip on the forward end portion which seats in a gate in the closed position. Pressurized melt flows through a melt passage which branches in the manifold and extends through each nozzle to a melt receiving space around the forward end portion. A circumferential sealing and locating flange prevents the leakage of melt from this space as the nozzle reciprocates.

11 Claims, 2 Drawing Sheets

INJECTION MOLDING MULTIPLE NOZZLE VALVE GATING SYSTEM

BACKGROUND OF THE INVENTION

This invention relates to injection molding and more particularly to a multi-cavity injection molding system with a number of heated nozzles having pointed tips fixed to a common manifold. The manifold and nozzles are actuated between a retracted open position and a closed position in which each of the nozzle tips is seated in a gate to provide valve gating.

Heated nozzles are well known in the injection molding art. However, they are normally seated in a well in the cavity plate and fixed to the manifold, and neither the nozzles or the manifold moves. Valve gating is also well known in the injection molding art, but is it normally provided by a valve pin which extends through a central bore in each nozzle into the gate. One example of this type of system is shown in the applicant's Canadian patent application Ser. No. 524,969 entitled "Mechanism for Valve Gated Injection Molding with Resilient Retaining Ring" which was filed Dec. 10, 1986. While this arrangement is satisfactory for many applications, it has the disadvantage that separate actuating mechanisms are required for each valve pin of the multi-cavity system.

More recently, as described in the applicant's U.S. Pat. No. 4,669,971 entitled "Valve Gated Probe" which issued June 2, 1987, a system has been provided in which a number of probes having melt channels extending towards a tip end are valve gated simultaneously by actuating the common manifold. Nozzles having pointed tips are also known, as shown in the applicant's U.S. Pat. No. 4,557,685 entitled "Heated Nozzle for Injection Molding Apparatus" which issued Dec. 10, 1985. New fixed nozzles having a pointed tip and a sealing and locating flange are shown in the applicant's Canadian patent application Ser. Nos. 086,621 entitled "Coated Injection Molding Nozzle and Method" filed Aug. 18, 1987 and 087,044 entitled "Injection Molding Nozzle with Hollow Sealing and Locating Flange and Method" filed Aug. 19, 1987.

SUMMARY OF THE INVENTION

Accordingly, it is an object of the invention to at least partially overcome the disadvantages of the prior art by providing a multi-cavity injection molding system in which valve gating is provided by actuating a common manifold to which a number of nozzles are fixed, the nozzles each having a pointed tip which seats in the respective gate.

To this end, in one of its aspects, the invention provides a multi-cavity hot runner injection molding system having a plurality of heated nozzles fixed to a common manifold with a hot runner passage which extends to convey pressurized melt from a molding machine through the manifold and nozzles to a plurality of gates in a cooled cavity plate, the melt passage branching in the manifold from a common inlet to a plurality of outlets, each nozzle having an outer surface and being received in a well with an inner surface in a cavity plate with a space between the outer surface of the nozzle and the inner surface of the well, each nozzle having a rear end fixed to the manifold and a forward end portion with a conical surface leading to a tip which is in alignment with the respective gate leading to a cavity, having the improvement wherein each nozzle has a melt bore which extends from an inlet at the rear end to at least one outlet on the conical surface of the forward end portion to form part of the hot runner passage, the inlet at the rear end being in alignment with one of the outlets from the manifold, the manifold and the nozzles are mounted for reciprocal motion according to a predetermined cycle between a closed position in which the tip of each nozzle is seated in a respective gate and a retracted open position, actuating means are provided to drive the manifold and the nozzles from the open position to the closed position, and each nozzle has a circumferential sealing and locating flange which extends outwardly to bridge the space between the outer surface of the nozzle and the inner surface of the well to form a melt receiving space around the forward end portion of the nozzle.

Further objects and advantages of the invention will appear from the following description taken together with the accompanying drawings.

DETAILED DESCRIPTION OF THE DRAWINGS

Figure 1:
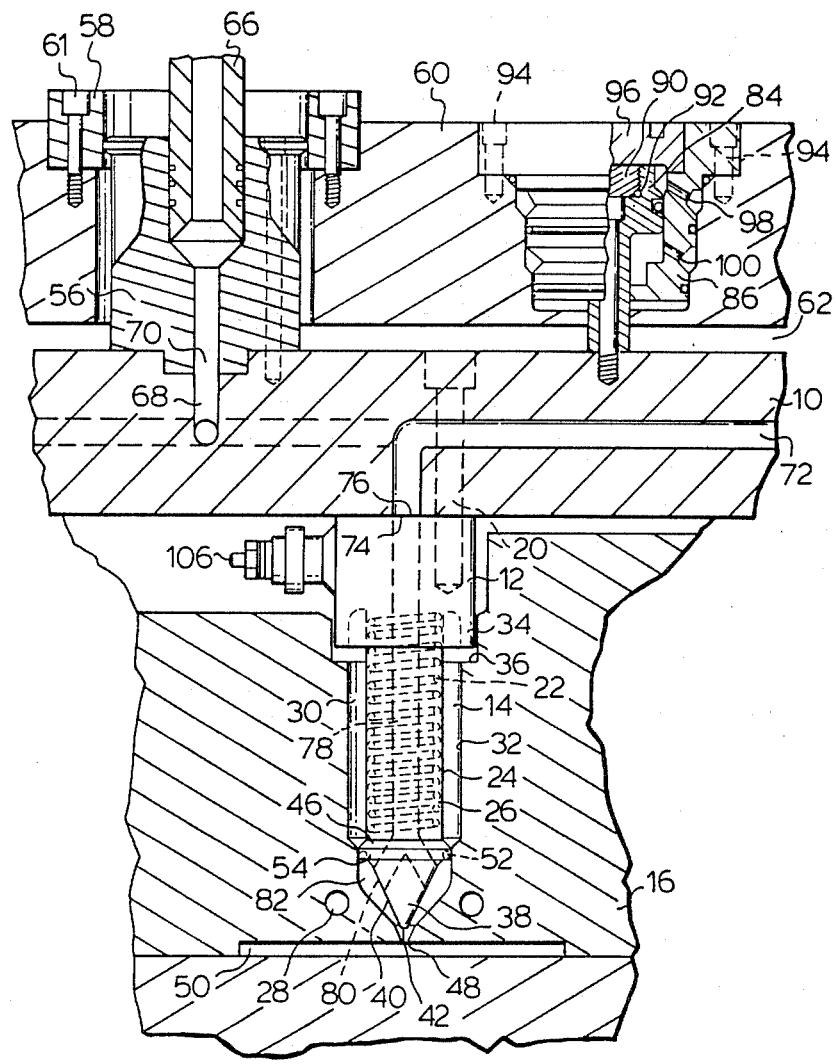
FIG. 1 is a sectional view of a portion of a multi-cavity injection molding system according to a preferred embodiment of the invention showing the manifold and the nozzles in the open position.
Figure 2:
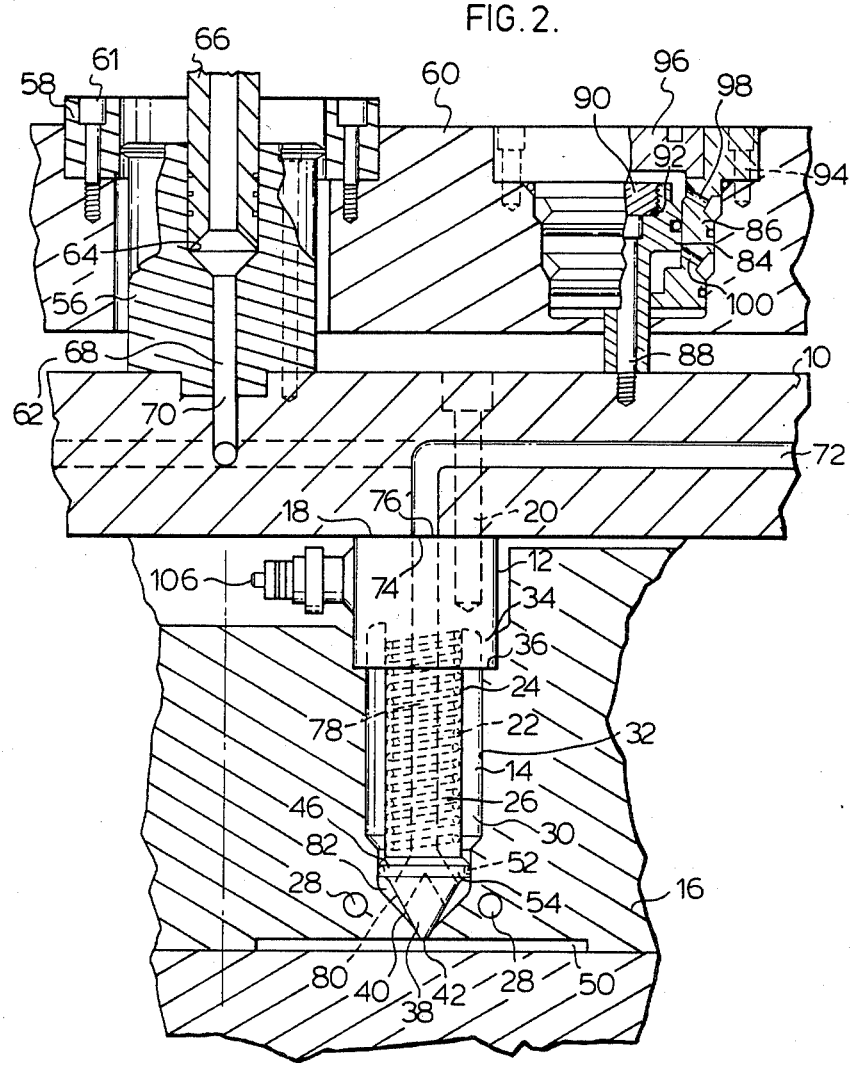
FIG. 2 is a similar view with the manifold and nozzles in the closed position.
Figure 3:
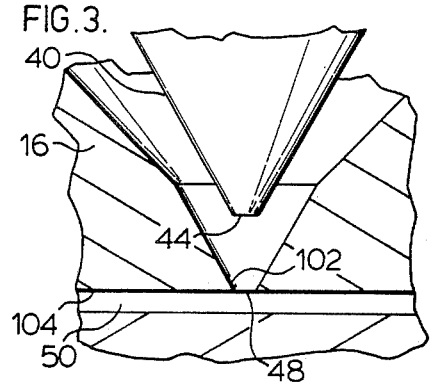
FIG. 3 is an enlarged view showing the position of the tip of one nozzle in the open position.
Figure 4:
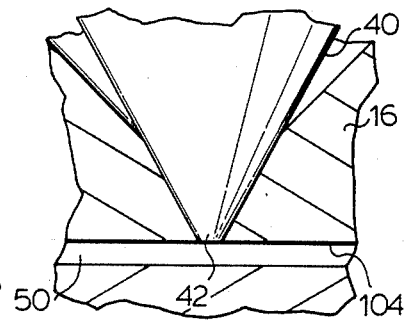
FIG. 4 is a similar view showing the closed position.

Reference is first made to FIGS. 1 and 2 which show a portion of a multi-cavity injection molding system having an elongated manifold 10 and a number of heated nozzles 12, each seated in a well 14 in the cavity plate 16. While only one nozzle 12 is shown, there are a number of them with rear ends 18 fixed in alignment to the manifold 10 by bolts 20. Each nozzle 12 can be made by the method described in the applicant's Canadian patent application Ser. No. 086,621 entitled "Coated Injection Molding Nozzle and Method" which was filed Aug. 18, 1987 and has a helical electrical heating element 22 brazed in the outer surface 24 of its steel body 26. The manifold 10 also has an electrical heating element (not shown) which is cast into it as described in the applicant's Canadian Pat. No. 1,174,020 entitled "Injection Molding Manifold Member and Method of Manufacture" which issued Sept. 11, 1984. As is well known, the cavity plate 16 is cooled by water which is pumped through cooling conduits 28. In order to provide an insulative air space 30 between the. outer surface 24 of the heated nozzle and the inner surface 32 of the well 14, each nozzle 12 is located by an insulation flange or bushing 34 which seats on a shoulder 36 of the well in the forward closed position shown in FIG. 2. Each nozzle 12 has a forward end portion 38 with a conical surface 40 having a truncated tip 42 with a flat forward surface 44. The nozzle is also located by a circumferential sealing and locating flange 46 which projects outwardly to contact the inner surface 32 of the well 14 to align the tip 42 of the nozzle with a gate 48 extending through the cavity plate 16 to the cavity 50. The sealing and locating flange 46 is made by the method described in detail in the applicant's patent application Ser. No. 087,044 entitled "Injection Molding Nozzle with Hollow Sealing and Locating Flange and Method" which was filed Aug. 19, 1987. As may be seen, the flange 46 has an internal air space 52 which extends circumferentially to further reduce the heat loss from the heated nozzle 12 to the surrounding cooled cavity plate 16. The flange 46 has a circular outer surface 54 which, in this embodiment, is thermal sprayed with a wear resistant ceramic coating. The coated surface 54 is ground to provide a smooth surface which forms a seal against the inner surface 32 of the well 14.

A manifold extension 56 is fixed to the manifold 10 and held in position by a locating collar 58 which is secured to a back plate 60 by screws 61. As is well known, the back plate 60 is secured relative to the cavity plate 16 by bolts (not shown) and an insulative air space 62 is provided between the cooled back plate 60 and the heated manifold 10. The manifold extension 56 has a central barrel 64 which receives the plunge nozzle 66 of the molding machine. The central barrel 64 extends to a bore 68 in the manifold extension 56 which leads, in turn, to an inlet 70 to a melt passage 72 which extends through the manifold 10 and the nozzles 12 to the gates 48. The melt passage 72 branches in the manifold 10 to a number of spaced outlets 74. In order to provide balanced flow to these outlets 74, the manifold 10 is made using two plates by the method described in the applicant's U.S. Pat. No. 4,648,546 entitled "Composite Plate Method of Manufacturing Injection Molding Manifold" which issued Mar. 10, 1987. Each outlet 74 is aligned with an inlet 76 in the rear end 18 of one of the nozzles 12 to a melt bore 78 which extends through the nozzle 12 and branches to a pair of outlets 80 on the conical surface 40 of the forward end portion 38 of the nozzle. As can be seen, these outlets 80 lead to a melt receiving space 82 which is provided around the forward end portion 38 of the nozzle 12 and extends to the cavity gate 48 leading to the cavity 50. The seal between the outer surface 54 of the sealing and locating flange 46 and the inner surface 32 of the well 14 prevents leakage of melt from the melt receiving space 82 into the insulative air space 30 during use.

The manifold 10 and the nozzles 12 fixed to it are driven by a pair of hydraulically actuated pistons 84 mounted in cylinders 86 in the back plate 60 on opposite sides of the melt passage inlet 70, only one of which is shown. Each piston 84 is connected to the manifold 10. A screw 88 extends through each piston 84 and is held in place by a plug 90 which is sealed against leakage by an o-ring 92. The cylinder 86 is secured in place by bolts 94 which extend into the back plate 60. The cylinder has a removable cap 96 to facilitate removal of the piston 84. Hydraulic fluid lines are connected through ducts 98, 100 to the cylinder 86 on opposite sides of the piston 84.

In use, the system is assembled as shown in FIGS. 1 and 2. The piston screws 88 are adjusted so that the truncated tip 42 of each nozzle 12 is seated in the gate 48 which has a matching conical surface 102. As can be seen, in this embodiment, the flat forward surface 44 of the tip 42 aligns with the side 104 of the cavity in the closed position to avoid forming an unsightly gate mark on the product. Electrical power is applied to the cold terminals 106 of the heating elements 22 in the nozzles 12 and the heating element (not shown) in the manifold 10 to heat them to a predetermined operating temperature. Pressurized melt is injected into the melt passage 72 from the plunge nozzle 66 of the molding machine. The melt flows through the melt passage 72 in the manifold 10 to the melt bores 78 of each of the nozzles and into the melt receiving spaces 82 around the forward end portions 38 of the nozzles 12. The melt pressure and the hydraulic fluid pressure applied to the ducts 98 is controlled to operate the system according to a predetermined cycle. In this embodiment, the hydraulic fluid pressure to the pistons is released as melt injection pressure is applied which forces the melt in the melt receiving spaces 82 against the forward end portions 38 of the nozzles 12 and drives them to the retracted open position shown in FIG. 1. The melt then flows through the gates 48 and fills the cavities 50. After the cavities 50 are filled, injection pressure is held momentarily to pack and then hydraulic pressure is applied to the pistons 84 to drive the manifold 10 and the attached nozzles 12 to the forward closed position shown in FIG. 2 with the tip 42 of each nozzle 12 seated in one of the gates 48. After a short cooling period, the high injection pressure is released and the mold is opened for ejection in a conventional manner. When the mold is closed after ejection, the hydraulic pressure to the pistons 84 is released and melt injection pressure is reapplied to drive the manifold 10 and nozzles 12 back to the open position. This cycle is repeated continuously several times per minute and the system must be able to operate for a long period of time without malfunctioning. While in this embodiment, the manifold and nozzles are driven to the retracted open position by melt pressure, in other embodiments hydraulic fluid pressure can be applied through both ducts 98, 100 to alternate sides of the pistons 84 to actuate them in both directions.

At the operating temperature, the outer surface 54 of the sealing and locating flange 46 of each nozzle abuts against the inner surface 32 of the well 14 and forms a seal against leakage of the melt as the nozzle reciprocates between the open and closed positions. As mentioned above, the outer surface 54 is thermal sprayed with a ceramic coating to reduce wear. As the piston 84 closes on each stroke, it displaces some of the melt in the space 82 around the forward end portion 38 of the nozzle which ensures the cavity 50 is fully packed as the gate 48 closes. While the flange 46 is shown with an insulative air space 52 to reduce heat loss to the cooled cavity plate 16, this may not be necessary for some applications where heat loss is not critical.

While the description of the system has been given with respect to a particular embodiment, it is not to be construed in a limiting sense. Variations and modifications will occur to those skilled in the art. For instance, the system can have various manifold and nozzle configurations and different actuating mechanisms can be used. Reference is made to the appended claims for a definition of the invention.

What I claim is:

1. In a multi-cavity hot runner injection molding system having a plurality of heated nozzles fixed to a common manifold with a hot runner passage which extends to convey pressurized melt from a molding machine through the manifold and nozzles to a plurality of gates in a cooled cavity plate, the melt passage branching in the manifold from a common inlet to a plurality of outlets, each nozzle having an outer surface and being received in a well with an inner surface in a cavity plate with a space between the outer surface of the nozzle and the inner surface of the well, each nozzle having a rear end fixed to the manifold and a forward end portion with a conical surface leading to a tip which is in alignment with the respective gate, leading to a cavity the improvement wherein:
   (a) each nozzle has a melt bore which extends from an inlet at the rear end to at least one outlet on the conical surface of the forward end portion to form part of the hot runner passage, the inlet at the rear end being in alignment with one of the outlets from the manifold,
   (b) the manifold and the nozzles are mounted for reciprocal motion according to a predetermined cycle between a closed position in which the tip of each nozzle is seated in a respective gate and a retracted open position,
   (c) actuating means are provided to drive the manifold and the nozzles from the open position to the closed position, and
   (d) each nozzle has a circumferential sealing and locating flange which extends outwardly to bridge the space between the outer surface of the nozzle and the inner surface of the well to form a melt receiving space around the forward end portion of the nozzle.

2. An injection molding system as claimed in claim 1 wherein the tip of each nozzle is truncated to provide a flat forward surface which extends to the cavity in the closed position.

3. An injection molding system as claimed in claim 2 wherein the actuating means also drives the manifold from the closed position to the retracted open position.

4. An injection molding system as claimed in claim 2 wherein the injection pressure of the melt applies sufficient force to the nozzles to drive the manifold and the nozzles to the retracted open position.

5. An injection molding system as claimed in claim 4 wherein the melt bore through each nozzle branches to a plurality of outlets on the conical surface of the forward end position.

6. An injection molding system as claimed in claim 5 wherein the sealing and locating flange of each nozzle has a smooth circular outer surface.

7. An injection molding system as claimed in claim 6 wherein the outer surface of each flange has a protective coating.

8. An injection molding system as claimed in claim 5 wherein the sealing and locating flange of each nozzle has an internal circumferentially extending insulative air space.

9. An injection molding system as claimed in claim 8 wherein the manifold is elongated with the plurality of nozzles in alignment.

10. An injection molding system as claimed in claim 9 wherein the actuating means include a pair of hydraulically actuated pistons mounted to drive the manifold and the attached nozzles to provide simultaneous movement of the nozzles from the open to the closed position.

11. An injection molding system as claimed in claim 10 wherein the manifold has a plunge nozzle receptacle connected in alignment with the inlet to the melt passage to receive pressurized melt from a fixed plunge nozzle on the molding machine without substantial leakage.

* * * * *